United States Patent [19]

Kastelic et al.

[11] Patent Number: 5,227,420

[45] Date of Patent: * Jul. 13, 1993

[54] POLYKETONE COMPOSITIONS

[75] Inventors: John R. Kastelic, Katy; Eric R. George, Houston; Joseph M. Machado, Richmond, all of Tex.

[73] Assignee: Shell Oil Company, Houston, Tex.

[ * ] Notice: The portion of the term of this patent subsequent to Aug. 31, 2005 has been disclaimed.

[21] Appl. No.: 750,376

[22] Filed: Aug. 27, 1991

Related U.S. Application Data

[63] Continuation-in-part of Ser. No. 288,919, Dec. 23, 1988, abandoned, which is a continuation-in-part of Ser. No. 94,977, Sep. 4, 1987, abandoned.

[51] Int. Cl.$^5$ .............................................. C08K 3/34
[52] U.S. Cl. .................................... 524/449; 524/444
[58] Field of Search ................................ 524/449, 444

[56] References Cited

U.S. PATENT DOCUMENTS

| | | | |
|---|---|---|---|
| 2,495,282 | 1/1950 | Pinkney | 260/67 |
| 2,495,286 | 1/1950 | Brubaker | 260/63 |
| 3,530,109 | 9/1970 | Fenton | 260/94.9 |
| 3,694,412 | 9/1972 | Nozaki | 260/63 |
| 3,780,140 | 12/1973 | Hammer | 525/185 |
| 3,835,123 | 9/1974 | Nozaki | 260/94.9 |
| 3,948,873 | 4/1976 | Hudgin | 260/94.9 |
| 4,066,604 | 1/1978 | Wang | 260/37 |
| 4,143,096 | 3/1979 | Hudgin | 260/878 |
| 4,317,765 | 3/1982 | Gaylord | 523/204 |
| 4,430,468 | 2/1984 | Schumacher | 524/109 |
| 4,434,258 | 2/1984 | Schumacher | 524/13 |
| 4,473,482 | 9/1984 | Serres et al. | 252/52 |
| 4,555,439 | 11/1985 | Ueeda et al. | 428/221 |
| 4,616,072 | 10/1986 | White | 525/539 |
| 4,742,107 | 5/1988 | Statz | 524/449 |
| 4,818,810 | 4/1989 | Drent | 528/392 |
| 4,835,250 | 5/1989 | Drent | 528/392 |
| 4,843,144 | 6/1989 | Van Broekhoven et al. | 528/392 |
| 4,868,282 | 9/1989 | Van Broekhoven et al. | 528/392 |
| 4,880,865 | 11/1989 | George | 524/449 |
| 4,880,903 | 11/1989 | Van Broekhoven et al. | 528/392 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 257663 | 3/1988 | European Pat. Off. . |
| 62-32144 | 2/1987 | Japan . |

OTHER PUBLICATIONS

Kirk-Othmer, Encyclopedia of Chemical Technology, Second Edition, vol. 13, pp. 398.
George, United States Statutory Invention Registration H886, Feb. 5, 1991.
George, United States Statutory Invention Registration H812, Aug. 7, 1990.

*Primary Examiner*—Paul R. Michl
*Assistant Examiner*—John J. Guarriello
*Attorney, Agent, or Firm*—Denise Y. Wolfs

[57] ABSTRACT

Polymer compositions comprising linear alternating polymers of carbon monoxide and at least one ethylenically unsaturated hydrocarbon filled with mica are prepared without the use of a coupling agent.

16 Claims, No Drawings

POLYKETONE COMPOSITIONS

RELATED APPLICATIONS

This application is a continuation-in-part of U.S. Ser. No. 288,919, now abandoned filed Dec. 23, 1988, which was a continuation-in-part of U.S. Ser. No. 094,977, now abandoned filed Sep. 4, 1987.

FIELD OF THE INVENTION

This invention relates to certain polymer compositions of improved mechanical properties. More particularly, the invention relates to a polyketone polymer filled with mica.

BACKGROUND OF THE INVENTION

Blending of organic polymers with inorganic fillers is well known. Blending typically serves to improve the mechanical properties of the polymer as well as to extend the polymer through use of generally less expensive fillers. Typical fillers include talc, mica, certain calcium carbonates, glass fibers, gypsum and others as disclosed in published Japanese Patent Application J59064647-A. The use of such fillers in polyolefins is disclosed in published Japanese Patent Application J59147035-A. The use of flaky fibers, particularly mica, in thermoplastic resins such as polyolefins is shown by Ueeda et al., U.S. Pat. No. 4,555,439.

The ease with which blends of an organic polymer and an inorganic filler are produced and processed is greatly dependent upon the physical properties of the polymer and the filler as well as the extent of interaction between the components of the blend. Particularly important is the degree of adhesion between the polymer and the filler, especially when the polymer blend is to be employed in the production of shaped articles or articles which are to be subjected to mechanical or thermal stress. Improvement in important mechanical properties such as tensile strength, stiffness, ductility, and high heat distortion temperature result when a relatively high degree of adhesion occurs between the polymer and the filler. Lack of adhesion can be sufficiently troublesome so as to require the addition of cross-linking agents to overcome the problem and result in satisfactory mechanical properties.

The above two published Japanese Patent Applications require the use of a silane cross-linking agent in order to obtain good mechanical properties when a number of inorganic fillers including mica are blended with polyolefins. Wang, U.S. Pat. No. 4,066,604 teaches the preferred use of nitrophenylenes or sulfonated polyphenylenes as cross-linking agents when mica is blended with certain branched polyphenylenes.

An easily observed measure of the degree of adhesion, or lack of adhesion, is the phenomena of whitening of a polymer composition under stress or distortion. The above published Japanese Patent Applications teach that resistance to whitening is a desired property of the disclosed compositions which employ cross-linking agents. Ueeda, U.S. Pat. No. 4,555,439 prepares rolled sheets of specific crystallinity and cites lack of whitening as an improved property.

U.S. Pat. No. 4,317,765 to Gaylord teaches that about 23 different hydroxyl-containing fillers can be added to about 76 different thermoplastic polymers. Among the fillers is mica and among the polymers listed is a copolymer of carbon monoxide and ethylene, with the structure of the copolymers being omitted. Gaylord further states that the properties of polymer compositions are improved only if a coupling or compatibilizing agent is employed in the compositions. Having established the need for a coupling agent or compatibilization process, Gaylord sets forth two methods of accomplishing the desired compatibilization through the use of coupling agents.

The class of polymers of carbon monoxide and olefin(s) has been known for some time. Brubaker, U.S. Pat. No. 2,495,286, produced such polymers of relatively low carbon monoxide content in the presence of free radical initiators, i.e., peroxy compounds. G.B. 1,081,304 produced similar polymers of higher carbon monoxide content in the in the presence of alkylphosphine complexes of palladium salts as catalyst. Nozaki extended this process to produce linear alternating polymers by the use of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon, e.g., ethylene or ethylene and propylene, has become of greater interest in part because of the greater availability of the polymers. These polymers, often referred to as polyketones or polyketone polymers, have been shown to be of the repeating formula $-CO+A+$ where A is the moiety of unsaturated hydrocarbon polymerized through the ethylenic unsaturation. For example, when the hydrocarbon is ethylene the polymer is represented by the repeating formula $-CO+CH_2-CH_2+$. The general process for the more recent production of such polymers is illustrated by a number of published European Patent Applications including 121,965, 181,014, and their U.S. equivalents, U.S. Pat. No. 4,835,250 and U.S. Pat. No. 4,818,810. The process typically involves a catalyst composition formed from a compound of a Group VIII metal selected from palladium, cobalt and nickel, the anion of a strong non-hydrohalogenic acid and a bidentate ligand of phosphorus, arsenic or antimony.

The resulting polymers are relatively high molecular weight thermoplastics having established utility in the production of shaped articles, such as containers for the food and drink industry, which are produced by processing the polymer according to known methods. For some particular applications it has been found desirable to have properties for a polymeric composition which are somewhat different from those of the polyketone polymers. It would be of advantage to retain the desirable properties of the polyketone polymers and yet improve other properties. These advantages are often obtained through the provision of a polymer blend. Reinforcing a polymer with a filler often provides a less expensive product, in addition to desirable properties.

It is an object of this invention to provide blends of a polyketone polymer filled with mica which exhibit desirable properties. It is a further object of this invention to prepare such mica-filled compositions without the use of a coupling or compatibilizing agent commonly used with other filled polymer compositions.

SUMMARY OF THE INVENTION

This invention relates to improved polymer compositions comprising an amount of a linear alternating polymer of carbon monoxide and at least one ethylenically unsaturated hydrocarbon filled with an amount of mica. The compositions exhibit good adhesion and mechanical properties without the addition of the coupling or compatibilizing agents often necessary in filled polymer blends. Muscovite is a preferred mica.

DESCRIPTION OF THE INVENTION

The polyketone polymers which are employed as the major component of the filled blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably from 2 to 10 carbon atoms inclusive, and are aliphatic such as ethylene and other α-olefins including propylene, butylene, isobutylene, 1-hexene, 1-octene and 1-dodecene, or are arylaliphtic containing an aromatic substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. Preferred polyketone polymers are copolymers of carbon monoxide and ethylene or are terpolymers of carbon monoxide, ethylene and a second hydrocarbon of at least 3 carbon atoms, particularly an α-olefin such as propylene.

The structure of the polyketone polymers is that of a linear alternating polymer of carbon monoxide and ethylenically unsaturated hydrocarbon, and the polymer will contain substantially one molecule of carbon monoxide for each molecule of unsaturated hydrocarbon. When terpolymers of carbon monoxide, ethylene and a second hydrocarbon are employed in the blends of the invention, there will be within the terpolymer at least about two units incorporating a moiety of ethylene for each unit incorporating a moiety of second hydrocarbon, preferably from about 10 units to about 100 units incorporating a moiety of ethylene per unit incorporating a moiety of the second hydrocarbon. The polymer chain is therefore represented by the formula

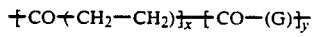

where G is the moiety obtained by polymerization of the second hydrocarbon through the ethylenic unsaturation. The —CO+CH₂—CH₂+ units and the —CO—(G)— units are found randomly throughout the polymer chain and the ratio of y:x is no more than about 0.5. In the modification of the invention where a copolymer of carbon monoxide and ethylene is employed as a blend component, there will be no second hydrocarbon and the polyketone polymer is represented by the above formula wherein y is 0. When y is other than 0, i.e., terpolymers are employed, ratios of y:x from about 0.01 to about 0.1 are preferred. The end groups or "caps" of the polymer chain will depend on what materials are present during the production of the polyketone and whether and how the polyketone is purified. The precise properties of the polymer will not depend upon the particular end groups to any considerable extent so that the polymer is fairly represented by the above formula for the polymeric chain.

Of particular interest are those polyketones of number average molecular weight from about 1000 to about 200,000, especially those polymers of number average molecular weight from about 10,000 to about 90,000 and containing substantially equimolar quantities of carbon monoxide and ethylenically unsaturated hydrocarbon.

Such polymers are produced by contacting the carbon monoxide and the ethylenically unsaturated hydrocarbon(s) under polymerization conditions in the presence of a catalytic quantity of a catalyst formed from a metal compound of palladium, cobalt or nickel, an anion of a non-hydrohalogenic acid having a pKa less than about 6, preferably less than about 2, and certain bidentate ligands of nitrogen or of phosphorus, arsenic or antimony. Although the scope of the polymerization process is extensive, for purposes of illustration, in a preferred method of producing the polyketone polymer, the metal compound is palladium acetate, the anion is the anion of tri-fluoroacetic acid or para-toluenesulfonic acid, and the bidentate ligand is 1,3-bis(diphenylphosphino)propane.

Polymerization is typically carried out at elevated temperature and pressure, in the gaseous phase in the substantial absence of reaction diluent, or in the liquid phase in the presence of a reaction diluent such as a lower alkanol, e.g., methanol or ethanol. Suitable reaction temperatures are from about 20° C. to about 150° C. with preferred reaction temperatures being from about 50° C. to about 135° C. Typical reaction pressures are from about 1 bar to about 200 bar, more typically from about 10 bar to about 100 bar.

The reactants and catalyst are contacted by conventional methods such as shaking or stirring and subsequent to reaction the polymer product is recovered as by filtration or decantation. The polymer product will, on occasion, contain metal or other residues of the catalyst which are removed, if desired, by treatment of the polymer product with a solvent which is selective for the residues.

Production of this class of polymers is illustrated, for example, by published European Patent Applications 181,014 and 121,965, and their U.S. equivalents, U.S. Pat. No. 4,818,810 and U.S. Pat. No. 4,835,250.

The physical properties of the polymer will be in part determined by the molecular weight and whether the polymer is a copolymer or terpolymer and what unsaturated hydrocarbons have been employed in its production. Typical melting points of the polyketone polymers are from about 175° C. to about 300° C., more frequently from about 210° C. to about 260° C. The polymers will have a limiting viscosity number (LVN), measured in a standard capillary viscosity measuring device in m-cresol at 60° C., from about 0.5 to about 10, preferably from about 0.8 to about 4.

The polymer compositions of the invention comprise the polyketone polymers above incorporating uniformly therein a proportion of mica. The compositions exhibit good adhesion and mechanical properties without the addition of the coupling or compatibilizing agents often necessary in filled polymer blends. The micas which are suitably used in the compositions of the invention are those silicate materials characterized physically as flat, six-sided monoclinic crystals which undergo a nearly perfect basal cleavage to yield thin, tough, flexible flakes. Such micas are characterized as high aspect ratio micas, having an aspect ratio of up to 20:1, preferably up to 100:1. The phrase, "the aspect ratio" of a mica particle is defined as the ratio of the length of a particle to the thickness of the particle. Larger particles tend to have higher aspect ratios.

The actual chemical composition of the mica will vary over a range of specific types of mica. Muscovite is a preferred mica but other natural or synthetic micas such as phlogophite, biolite, fluorophlogopite, and barium fluorophlogopite and barium disilicate can be used. Micas are further described in Kirk-Othmer, Encyclopedia of Chemical Technology, Second Edition, Vol. 13, pp. 398-424, incorporated herein by reference.

The size of the particles of mica which are useful in the present invention can vary but particles from about 50 mesh to about 600 mesh are suitable with particles from about 80 mesh to about 200 mesh being preferred for some applications, and all based on U.S. Bureau of Standards mesh sizes.

The amount of mica to be incorporated into the compositions of the invention can vary widely. Preferably, a lesser amount of mica on a volume basis, relative to the polymer which is present as the major component in the total blend, is used. Amounts of mica from about 1% by volume to about 35% by volume, or from about 2% by weight to about 56% by weight, based on the total composition, are satisfactory with amounts from about 2% by volume to about 30% by volume, or from about 5% by weight to about 51% by weight, based on the total composition, being preferred, and amounts of from about 5% by volume to about 30% by volume, or from about 11% by weight to about 51% by weight, being more preferred.

The method of forming the polymer compositions is not critical so long as the method results in a substantially uniform blend of the composition components. The components are dry blended and converted to a substantially uniform composition by application of elevated temperature and pressure. Alternatively, the polymer is heated until molten and the mica mixed therewith through the use of a high-shear mixer, extruder or kinetic compounder.

The composition of the invention, in addition to polymer and mica, may incorporate conventional additives such as plasticizers, mold release agents, antioxidants, fire retarding chemicals, pigments, and other materials to improve the processability or properties of the polymer blend. Such additives may be added by blending or other conventional methods together with or separately from the mica.

The resulting compositions are processed by conventional methods such as injection molding, pressure forming, thermoforming, sheet extrusion and sheet casting which do not serve to degrade the polymer or the composition.

The compositions are characterized by improved mechanical properties of stiffness, high heat distortion temperature, and strength, and by resistance to stress-whitening in molded articles, even those articles which incorporate rather sharp angles in their physical shape.

The novel blend compositions have particular utility in the production of containers and mechanical parts, particularly those having a large and continuous surface where strength, uniformity, and appearance are important. Moreover, the compositions of the invention exhibit improved paint adhesion which, together with a high heat distortion temperature, offer significant advantages when paints requiring baking are employed, e.g., in exterior automobile parts. Other applications in which the compositions of the invention offer significant advantages are those applications having high temperature requirements.

The compositions of the invention are further illustrated by the following Examples which should not be construed as limiting the invention.

EXAMPLE 1

A linear alternating polyketone terpolymer of carbon monoxide, ethylene and propylene was prepared in the presence of a catalyst formed from palladium acetate, the anion of trifluoroacetic acid, and 1,3-bis(diphenylphosphino)propane. The polymer had a melting point of 215°-220° C.

EXAMPLE 2

The polymer of Example 1 was blended with 15% by weight of mica by use of a 30 mm twin-screw extruder, extruded and pelletized to produce nibs. The nibs were dried, then injection molded into plaques of dimensions approximately 4 in. by 4 in. by 0.05 in. These plaques were deformed by Solid Phase Pressure Forming into shallow 2 oz. cups. There was no visual evidence of stress whitening. The nibs were also molded into test bars having dimensions approximately 4.5 in×0.5 in×0.12 in. These bars were evaluated for tensile properties according to ASTM D-638. The results are shown in Table 1.

EXAMPLE 3

Blends of 20% by weight of mica and the polymer of Example 1 were prepared by use of a 30 mm twin-screw extruder to produce nibs. The nibs were molded into plaques of dimensions approximately 4 in.×4 in.×0.05 in. by injection molding. These plaques were formed into shallow trays and 2 oz. cups which exhibited high stiffness and good appearance without visual evidence of whitening under stress. The nibs were also molded into test bars having dimensions approximately 4.5 in×0.5 in×0.12 in. These bars were evaluated for tensile properties according to ASTM D-638. The blends were also tested for Notched Izod using ASTM D-256, and for heat deflection temperature (at 264 psi). The results are shown in Table 1.

EXAMPLE 4

Blends of 30% by weight of mica and the polymer of Example 1, were prepared in the manner described in Example 3. Nibs were were molded into test bars having dimensions approximately 4.5 in×0.5 in×0.12 in. These bars were evaluated for tensile properties according to ASTM D-638. The blends were also tested for Notched Izod, using ASTM D-256, and heat deflection temperature (at 264 psi). The results are shown below in Table 1.

TABLE 1

| Wt % Mica | 1% Secant Modulus (psi) | Stress at Yield (psi) | Elongation at Failure (%) | Notched Izod (ft-lb/in) 23° C. | Notched Izod (ft-lb/in) −40° C. | Heat Deflection Temperature (°C.) |
|---|---|---|---|---|---|---|
| 0 | 200,00-250,000 | 7,000-8,000 | 60-120 | 4.3 | — | 96 |
| 15 | 521,000 | 3988 | 33.6 | — | — | — |
| 20 | 418,000 | 9070 | 11.0 | 1.04 | 0.56 | 148 |
| 30 | 548,000 | 9610 | 6.9 | 0.84 | 0.56 | 159 |

EXAMPLE 5

For comparative purposes, three specific "neat" novel polyketones, noted hereafter as Control A, Control B, and Control C were prepared into test plaques and test samples and evaluated for flexural modulus (in psi), tensile strength (in psi), and Notched Izod (in ft-lb/in) at room temperature and at −29° F. Additionally, Control B was evaluated for its heat deflection temperature. Flexural modulus was determined using ASTM D-790. Tensile strength was determined using ASTM D-638. Notched Izod determination was made using ASTM D-256. The results of the analyses are shown in Table 2.

More specifically, Control A was a linear alternating terpolymer prepared in the presence of a catalyst formed from palladium acetate, the anion of a trifluoroacetic acid and 1,3-bis(diphenylphosphino) propane. The polymer had a melting point of 220° C. and a limiting viscosity number (LVN) of 1.96 dl/g, measured in m-cresol at 60° C.

Control B was a blend of two linear alternating polymers. Control B comprised 33% of the polyketone polymer 088/005 and 67% of the polyketone polymer 088/006. Polymer 088/005 was a linear alter-nating terpolymer of ethylene and 7 wt % propylene prepared by employing a catalyst composition formed from palladium acetate, the anion of trifluoroacetic acid and 1,3-bis[di(methoxy-phenol)phosphino]propane. Polymer 088/005 had a melting point of 220° C. and an LVN of 1.79 dl/g, measured in m-cresol at 60° C. Polymer 088/006 was a linear alternating polymer prepared in a manner identical to the 088/005 polymer. The 088/006 polymer had a melting point of 223° C. and an LVN of 1.62 dl/g. The neat polymer blend of Control B was formed by dry mixing pellets of the two polymers 088/005 with 088/006 in a conventional manner. The blended mixture was then melt blended in a 30 mm co-rotating twin screw extruder having seven zones and a total L/D of 27/1. The melt temperature at the die exit was 260° C.

Control C was linear alternating polyketone polymer known as 088/008, prepared in the presence of a catalyst formed from palladium acetate, the anion of trifluoroacetic acid and 1,3-bis(diphenyl phosphino)propane. The polymer had a melting point of 223° C. and an LVN of 1.73 dl/g measured in m-cresol at 60° C.

EXAMPLE 6

The polymers of Example 5, Controls A, B, and C, were used to prepare several filled blend samples by compounding the polymer with filler(s) on a 30 mm, 27/1 L/D twin screw extruder. The fillers used included mica, glass fiber, and a mica/glass fiber blend. The mica used was a phyllosilicate mica, Asprapearl. The blends were extruded into water and pelletized. The pellets were dried and injection molded. An Engel (8 oz.) injection molder equipped with a 2.2/1 compression ratio screw was used for several moldings. The molder formed standard family test specimens which were tested using the ASTM tests noted above. The results of the tests are shown in Table 2.

The specific reinforcing components provided different strength and modulus values when blended with the Controls A, B, and C. Certain of these components appear to act synergistically with the polyketone causing a definite change in the properties of the polyketone with each blend. Mica provided a polymer with strength characteristics that were better than the neat polymer control, but which were not as good as the glass fibers alone or the mica/glass combination. High aspect ratio mica platelets provided good heat deflection temperature, but not quite as good strength as the glass fibers.

TABLE 2

|  | Flexural Modulus (psi) | Tensile Strength (psi) | Notched Izod (ft-lb/in) Room Temperature | Notched Izod (ft-lb/in) 29° C. | Heat Deflection Temperature (°F.) |
| --- | --- | --- | --- | --- | --- |
| Controls |  |  |  |  |  |
| Control A | 240,000 | 7000–8000 | 4.8 | 1.2 | — |
| Control B | 263,000 | 7000–8000 | 3.0 | — | 205 |
| Control C | 200,000–250–000 | 7000–8500 | 4.3 | 1.1 | — |
| Mica Blends |  |  |  |  |  |
| 10 wt % | 310,000 | 8500 | 0.6–0.75 | — | 250–260 |
| 1 wt % | 265,000 | 6500 | 3.75–5 | — | — |
| Mica/Glass Fiber Blends |  |  |  |  |  |
| 10 wt % mica + 5 wt %/glass | 400,000 | 8200–7500 | 1.8 | 0.9 | 240 |
| Glass Fiber Blends |  |  |  |  |  |
| 9.9 wt % (polar sized) | 304,000 | 10,300 | 2.1 | 0.9 | — |
| 9.9 wt % (not polar sized) | 230,000 | 8300 | 1.7 | 0.8 | — |

EXAMPLE 7

Linear alternating terpolymers of carbon monoxide, ethylene, and propylene (89/054 and 89/056) were produced in the presence of a catalyst composition formed from palladium acetate, trifluoracetic acid and 1,3-bis[-di(2-methoxyphenyl)phosphino]propane. The polyketone polymers had melting points of about 220°–222° C. and LVNs of about 1.08 dl/g when measured in m-cresol at 60° C. The polyketone polymers also contained 0.5% Ethanox 330 and 0.5% Nucrel 535, both conventional additives.

EXAMPLE 8

The relative importance of a surface coating on the mica employed was investigated by preparing blends of polyketone polymers and micas with and without surface coatings. Filled blend compositions were prepared by combining the polymers of Example 7 with two different types of mica. The two micas used were: Aspraflex 100, muscovite mica with no surface treatment and Aspralok 100, muscovite mica with a coupling agent suitable for polyethylene, both obtained from J. M. Huber. The micas had comparable particle size ranges.

The filled blends were prepared by dry blending polyketone polymer powder with the micas at the prescribed composition, and subsequently melt compounding the samples in a Haake 30 mm co-rotating, fully intermeshing, twin-screw extruder operating at about 200 rpm and a melt temperature of about 250° C. Test specimens were prepared using an Arburg injection molding machine with a 25 mm diameter and a 20 ton clamp. All compounds were dried prior to molding, and molded specimens were stored over dessicant prior to testing.

The samples were tested for mechanical and impact properties, as well as heat deflection temperature (at 264 psi). The results are shown in Table 3.

The filled blends were prepared as described in Example 8. The samples were then tested for mechanical and impact properties, as well as heat deflection temperature (at 264 psi). The results are shown in Table 4.

The muscovite micas provided better reinforcement than the phlogopite mica at comparable levels in the polyketone polymer. The muscovite-filled blends exhibited greater tensile strength and stiffness (measured by flexural modulus) than the phlogopite-filled blends at comparable loadings.

TABLE 4

| Mica Type | Mica Content vol % | Mica Content wt % | Flexural Modulus (psi) | Tensile Strength (psi) | Notched Izod @ RT (ft-lb/in) | Gardner Impact @ RT (in-lb) | Heat Deflection Temperature (°C.) |
|---|---|---|---|---|---|---|---|
| Control | 0 | 0 | 259,000 | 9130 | 1.93 | 126 | 103 |
| Aspraflex 100 | 10 | 22 | 606,000 | 8500 | 0.86 | 8 | 159 |
|  | 20 | 38 | 994,000 | 9830 | 0.61 | 3 | 181 |
| WG-325 ™ | 10 | 22 | 526,000 | 8260 | 0.97 | 10 | 148 |
|  | 20 | 38 | 859,000 | 8410 | 0.68 | 3 | 175 |
|  | 30 | 51 | 1,138,000 | 8300 | 0.60 | 4 | 181 |
| Suzorite ® 325-HK | 20 | 38 | 723,000 | 7700 | 0.62 | 6 | 167 |

EXAMPLE 10

The relative importance of particle size was investigated by preparing blends with micas having several particle sizes. Filled blend compositions were prepared by combining the polymers of Example 7 with three different micas, using the methods described in Exam-

TABLE 3

| Mica Type | Mica Content vol % | Mica Content wt % | Flexural Modulus (psi) | Tensile Strength (psi) | Notched Izod @ RT (ft-lb/in) | Gardner Impact @ RT (in-lb) | Heat Deflection Temperature (°C.) |
|---|---|---|---|---|---|---|---|
| Control | 0 | 0 | 259,000 | 9130 | 1.93 | 126 | 103 |
| Aspraflex 100 | 10 | 22 | 606,000 | 8500 | 0.86 | 8 | 159 |
|  | 20 | 38 | 994,000 | 9830 | 0.61 | 3 | 181 |
| Aspralok 100 | 10 | 22 | 533,000 | 8870 | 0.92 | 8 | 162 |
|  | 20 | 38 | 849,000 | 9140 | 0.61 | 5 | 172 |
|  | 30 | 51 | 1,209,000 | 9990 | 0.61 | 4 | — |

The results in Table 3 indicate that the untreated mica produced stiffer blends, as measured by flexural modulus, than the mica with a surface coating, at similar mica loadings. The untreated mica also produced compounds with the greatest strength and with a higher heat deflection temperature at the 20% by volume loading. As expected, Notched Izod and Gardner impact values were better for the control than for the filled systems.

These results indicate that superior blends of polyketone polymers and mica may be obtained without the use of conventional coupling or compatibilizing agents.

EXAMPLE 9

Two different types of mica were evaluated by preparing blends of the polyketone polymers of Example 7 and both muscovite mica and phlogopite mica. The muscovite micas were Aspraflex 100, obtained from J. M. Huber, and WG-325 ™, obtained from KMG Minerals. The phlogopite mica was Suzorite ® 325-HK, obtained from Suzorite Mica Products. None of the micas had a surface treatment, and all had comparable particle size ranges.

ple 8.

The micas used were all phlogopite micas obtained from Suzorite Mica Products: (1) Suzorite ® 150-S, a coarse grind mica with 60% of the particles greater than 200 mesh (74 microns), (2) Suzorite ® 200-HK, with 44-63% of the particles less than 325 mesh (44 microns), and (3) Suzorite ® 325-HK, with 92% of the particles less than 325 mesh. The samples were all tested for mechanical and impact properties, as well as heat deflection temperature (at 264 psi). The results are shown in Table 5.

The results indicate that the more coarsely ground micas provide filled blends with greater stiffness than the micas that are more finely ground. The particles size of the mica also relates to its aspect ratio. Larger particles have higher aspect ratios, and a higher aspect ratio would be expected to provide superior stiffness for mica-filled compounds. However, the higher Notched Izod values for the blends containing the more coarsely ground mica is an unexpected result. Generally, one would expect a smaller particle size to be more effective at providing the toughness measured by Notched Izod.

TABLE 5

| Mica Type | Mica Content vol % | Mica Content wt % | Flexural Modulus (psi) | Tensile Strength (psi) | Notched Izod @ RT (ft-lb/in) | Gardner Impact @ RT (in-lb) | Heat Deflection Temperature (°C.) |
|---|---|---|---|---|---|---|---|
| Control | 0 | 0 | 259,000 | 9130 | 1.93 | 126 | 103 |
| Suzorite ® 150-S | 20 | 38 | 897,000 | 7140 | 0.90 | 8 | 172 |
| Suzorite ® 200-HK | 20 | 38 | 796,000 | 7440 | 0.74 | 6 | 172 |

TABLE 5-continued

| Mica Type | Mica Content vol % | Mica Content wt % | Flexural Modulus (psi) | Tensile Strength (psi) | Notched Izod @ RT (ft-lb/in) | Gardner Impact @ RT (in-lb) | Heat Deflection Temperature (°C.) |
|---|---|---|---|---|---|---|---|
| Suzorite ® 325-HK | 20 | 38 | 723,000 | 7700 | 0.62 | 6 | 167 |

What is claimed is:

1. A filled polymer composition consisting essentially of:
   a linear alternating polyketone polymer of carbon monoxide and at least one ethylenically unsaturated hydrocarbon, wherein the polyketone polymer is represented by repeating units of the formula:

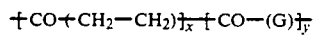

wherein G is a moiety of an ethylenically unsaturated hydrocarbon of at least 3 carbon atoms polymerized through the ethylenic unsaturation, and the ratio of y:x is no more than about 0.5, and
   from about 1 vol % to about 35 vol % of mica, based on filled composition, having a particle size of from about 50 mesh to about 600 mesh.

2. A filled polymer composition consisting essentially of:
   a linear alternating polyketone polymer of carbon monoxide and at least one ethylenically unsaturated hydrocarbon, wherein the polyketone polymer is represented by repeating units of the formula:

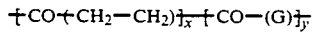

wherein G is a moiety of an ethylenically unsaturated hydrocarbon of at least 3 carbon atoms polymerized through the ethylenic unsaturation, and the ratio of y:x is no more than about 0.5, and from about 1 vol % to about 35 vol % of mica, based on filled composition, wherein the mica has no surface treatment.

3. The composition of claim 1 wherein the mica is present in an amount from about 2 vol % to about 30 vol %, based on total composition.

4. The composition of claim 1 wherein the mica has a particle size of from about 80 to about 200 mesh.

5. The composition of claim 1 wherein the mica is present in an amount from about 5 vol % to about 30 vol %, based on total composition.

6. The composition of claim 1 wherein the mica is muscovite.

7. The composition of claim 1 wherein, in the linear alternating polymer, G is a moiety of propylene, and the ratio of y:x is from about 0.01 to about 0.1.

8. The composition of claim 1 wherein in the linear alternating polymer, y is zero.

9. An article of manufacture comprising the composition of claim 1.

10. The composition of claim 2 wherein the mica is present in an amount from about 2 vol % to about 30 vol %, based on total composition.

11. The composition of claim 2 wherein the mica is present in an amount from about 5 vol % to about 30 vol %, based on total composition.

12. The composition of claim 2 wherein the mica has a particle size of from about 80 to about 200 mesh.

13. The composition of claim 2 wherein the mica is muscovite.

14. The composition of claim 2 wherein, in the linear alternating polymer, G is a moiety of propylene and the ratio of y:x is from about 0.01 to about 0.1.

15. The composition of claim 2 wherein, in the linear alternating polymer, y is zero.

16. An article manufactured from the composition of claim 2.

* * * * *